March 16, 1937.  E. W. DAVIS  2,074,143
LUBRICATING APPARATUS
Filed Jan. 12, 1934  2 Sheets-Sheet 2
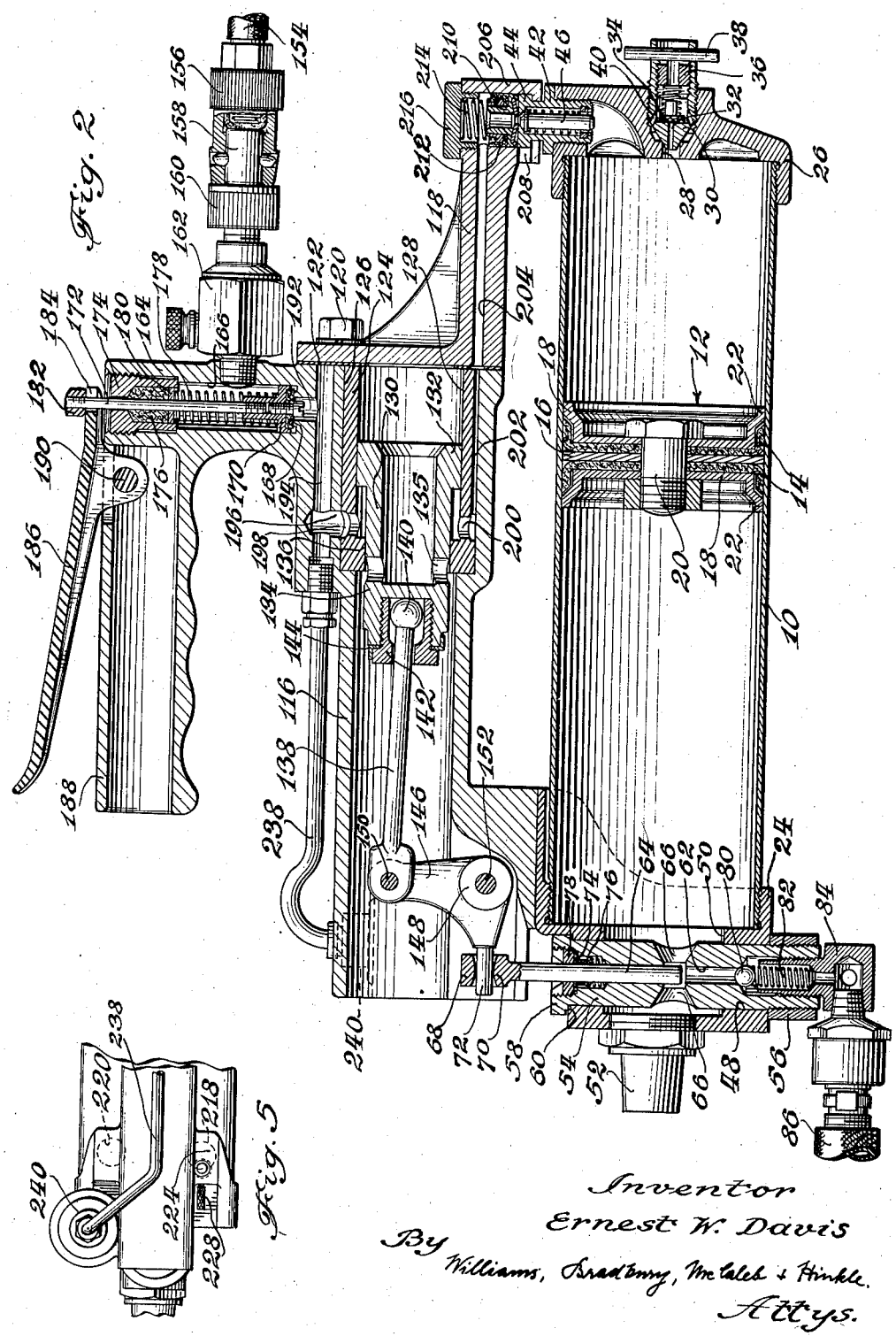
Inventor
Ernest W. Davis
By Williams, Bradbury, McCaleb & Hinkle
Attys.

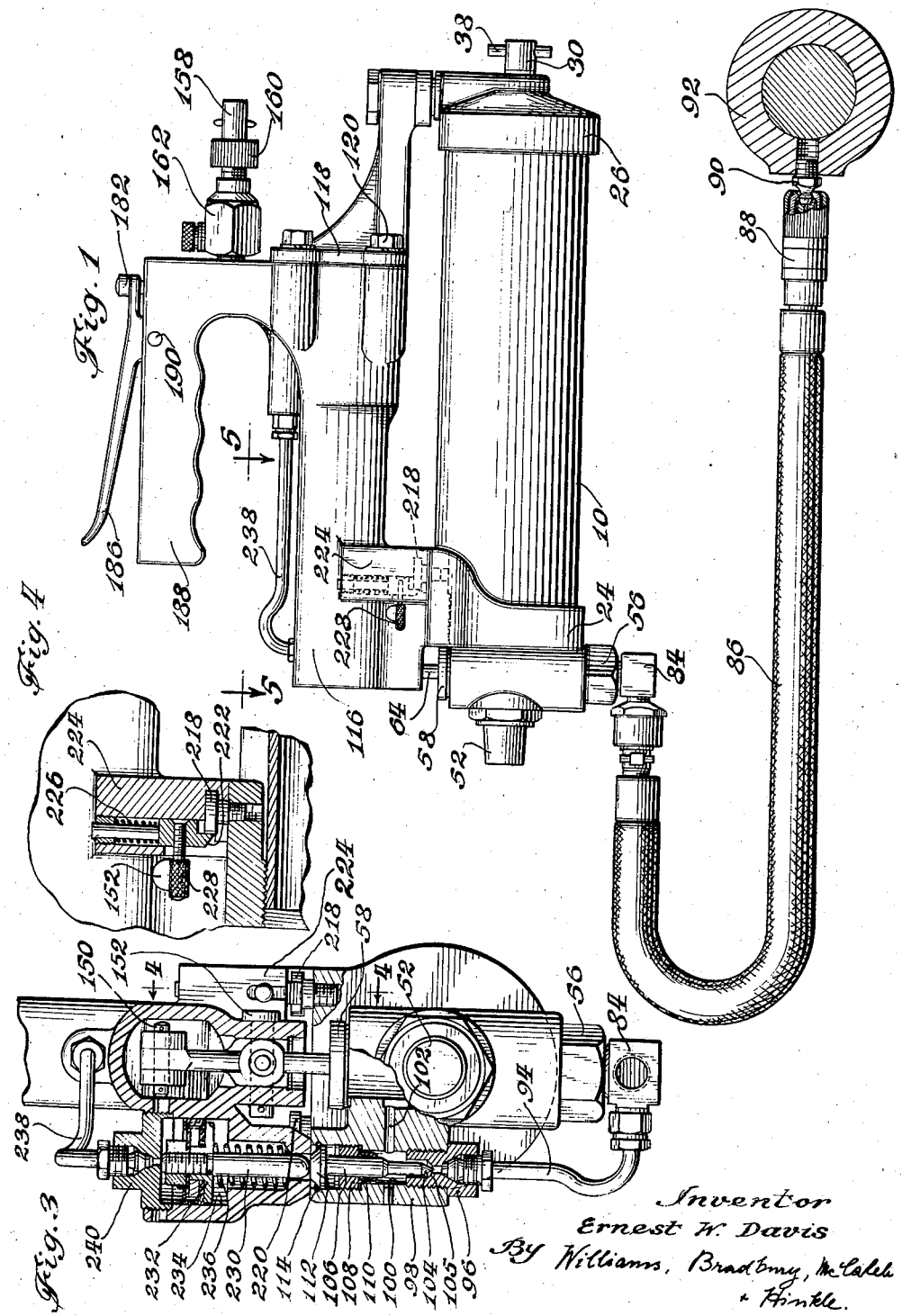

Patented Mar. 16, 1937

2,074,143

UNITED STATES PATENT OFFICE 2,074,143

LUBRICATING APPARATUS

Ernest W. Davis, Oak Park, Ill., assignor to Stewart-Warner Corporation, Chicago, Ill., a corporation of Virginia Application January 12, 1934, Serial No. 706,351

21 Claims. (Cl. 221—47.3)

My invention relates generally to lubricating apparatus and more particularly to improvements in power-operated high-pressure lubricant compressors.

It is an object of my invention to provide an improved portable high-pressure lubricant compressor for the lubrication of automobiles and similar machinery, the bearings of which require different kinds of lubricant.

A further object is to provide a compressor of the aforementioned type in which a lubricant reservoir, together with a high-pressure plunger, may be detachably connected to the pneumatic motor.

A further object is to provide an improved lubricant compressor having detachable power means with means for automatically relieving the lubricant pressure in the discharge conduit when the motor is not operating.

A further object is to provide an improved pneumatically-operated lubricant compressor having a plurality of interchangeable lubricant reservoirs and pumping mechanisms, which is simple in construction, may be economically manufactured, and which will operate satisfactorily to inject lubricant under high pressure.

Other objects will appear from the following description, reference being had to the accompanying drawings, in which Figure 1 is a side elevation of the lubricant compressor showing its discharge hose connected to a bearing to be lubricated, the latter and a portion of the coupler at the end of the discharge hose being shown in section;

Figure 2 is a central longitudinal sectional view of the compressor;

Figure 3 is a vertical sectional view of the mechanism for relieving the pressure in the discharge conduit;

Figure 4 is a fragmentary sectional view showing the latch for holding the reservoir connected to the air motor; and Figure 5 is a fragmentary plan view taken on the line 5—5 of Figure 1.

The lubricant compressor comprises a cylindrical barrel 10 in which a follower piston 12 is freely reciprocable, the piston comprising a pair of oppositely-facing cup leathers 14 pressed against a backing plate 16 by a pair of cup-shaped stampings 18 which are clamped together by a bolt 20. The stampings 18 have flanges 22 which engage the walls of the barrel 10 to prevent tilting or canting of the reservoir in the barrel.

The ends of the barrel are screwed into a head 24 and cap 26, respectively. The cap 26 has a vent 28 therein, the vent being normally closed by a valve body 30 threaded in the cap. The valve body 30 has a port or a passageway 32 formed therein, the end of which is normally closed by a spring-pressed valve 34, the tension of which may be adjusted by means of an apertured plug 36 threaded in the valve body 30. A cross-pin 38 is secured in the valve body 30 to provide a convenient grip for unscrewing the valve body when it is desired to uncover the vent opening 28. When the valve body 30 is partially unscrewed, air under pressure may escape through the vent opening 28 and a passageway 40 formed in the valve body 30 to by-pass the valve 34.

An air inlet fitting 42 having an enlarged head 44 is threaded in the cap 26, the opening in the fitting being normally closed by a spring-pressed plunger check valve 46.

The head 24 has a bore 48 formed therein which intersects an enlarged cored hole 50 formed in the head. A filling nib 52 is threaded in the head 24 communicating with the cored hole 50 of the head. A cylinder 54 is secured in the bore 48, being tightly clamped therein by a nut 56 threaded upon its lower end, the latter drawing a flange 58 formed at the upper end of the cylinder firmly against a gasket 60.

The cylinder body 54 has a high pressure cylinder 62 formed therein, in which a plunger 64 is reciprocable. Lubricant may flow into the high pressure cylinder 62 through a pair of inlet ports 66. The plunger 64 has an enlarged head 68. The head 68 has a transversely extending opening 70 which forms a rocking bearing for the operating pin 72 forming part of the air motor hereinafter to be described. Leakage of lubricant past the plunger is prevented by a hat-washer 74, the flange of which is held against the plunger by a spring-pressed dished washer 76 and which is clamped in place by a ring 78 threaded in the end of the cylinder body 54.

The outlet end of the cylinder 62 is normally closed by a ball check valve 80 held against its seat by a spring 82, the latter being seated in an elbow fitting 84 threaded into the lower end of the cylinder body 54.

A discharge conduit, illustrated as a flexible hose 86, is suitably connected to the elbow 84 and at its outer extremity carries a coupler 88. The coupler is adapted to be detachably connected to a lubricant receiving fitting 90 threaded into a bearing 92 to be lubricated. The coupling and fitting are not illustrated in detail but may be of any suitable construction, such, for example, as disclosed in the application of Joseph Bystricky, Serial No. 661,713, filed March 20, 1933.

In the operation of many of the couplers used in high pressure lubricating systems. such, for example, as that shown in the aforesaid Bystricky application, and in the patent to Arthur V. Gullborg, No. 1,307,734, it is desirable to provide means for relieving the lubricant pressure in the discharge conduit upon the completion of a lubricating operation. This is especially desirable and in fact sometimes practically necessary when the bearing being lubricated offers high resistance to the flow of lubricant. In such instances the coupler which is lubricant pressure operated is held locked to the fitting by the residual pressure in the lubricant discharge conduit.

To relieve the lubricant pressure in the discharge conduit after the lubricating operation has been completed, I have provided a by-pass from the discharge conduit to the barrel reservoir 10 which is adapted to be closed during the lubricating operation and opened upon the completion of the operation. This by-pass comprises a conduit 94 (Figure 3), one end of which is secured to the elbow fitting 84 and the other end of which is secured to a bushing 96 threaded in a boss 98 which extends sidewardly from the head 24. The boss has a bore 100 therein which communicates with the cored opening 50 formed in the head 24 through a passageway 102.

A valve 104 is arranged to engage a suitable seat 105 formed in the bushing 96, the valve being formed at the end of a stem 106 which is guided for longitudinal movement in a bushing 108 threaded in the upper end of the bore 100 and which is sealed by a hat-washer 110 clamped in place by the bushing 108. The stem 106 is provided with an enlarged head 112 and is retained in the bore of the boss 98 by a split ring spring 114 seated in a suitable annular groove and against which the head 112 is adapted to abut.

The air motor for operating the compressor comprises a body 116, preferably a die casting, and a head casting 118 secured thereto by a plurality of studs 120, a suitable gasket 122 being interposed between the body and the head casting to form an air-tight seal therebetween.

A cylinder liner 124 is retained in a bore 126 formed in the body 116 by the head 118, the liner having a cylinder bore 128 formed therein to receive a hollow piston 130. The piston has an enlarged diameter head portion 132 which has a sliding fit in the cylinder 128 and has a body portion 134 provided with ports 135, and slidable in the reduced diameter portion 136 of the liner 130.

A connecting rod 138 has a spherical head 140 which fits loosely in the socket formed in a bushing 142 threaded in the end of the reduced diameter portion 134 of the piston, the bushing being retained by a lock washer 144. The opposite end of the connecting rod 138 is forked and pivotally connected to the upwardly extending arm 146 of a bell crank lever 148 by means of a pin 150. The bell crank lever is freely pivoted on a pin 152 which projects through the walls of the body 116. The other arm of the bell crank lever 146 terminates in the cylindrical pin-like projection 72 which projects through the eye of the plunger 64.

Air under pressure is adapted to be supplied to the air motor through a hose 154 which terminates in a coupler 156 connected to a pin fitting 158, the coupler being retained upon the fitting by a collar 160 threaded on the fitting. The fitting 158 is threaded in a combined oiler and air strainer 162 which may be of any suitable construction, and the latter is threaded in the upwardly projecting portion 164 of the casting 116, communicating with a valve chamber 166 formed in said body portion.

A valve seat 168 is formed at the lower end of the valve chamber for an air control valve 170 carried by a stem 172. The stem 172 is guided in a bushing 174 threaded in the upper end of the valve chamber 166, suitable packing 176 being provided to form an air-tight seal, the packing being compressed by a compression coil spring 178, the upper end of which engages a packing disk 180 and the lower end of which rests upon the valve 170, tending to hold the latter against the seat 168. The upper end of the valve stem 172 has a nut 182 threaded thereon, the stem projecting through a slot 184 formed in the end of a valve trigger 186. The valve trigger extends along a suitable handle 188 cast integrally with the body 116 and is pivoted upon a pin 190 which is anchored in the handle 188.

The passageway 192 from the valve seat 168 communicates with a duct 194 which in turn communicates through a port 196 with an annular passageway 198 formed about the liner 124. A plurality of ports 200 connect the annular passageway 198 with the cylinder bore 128. A duct 202 communicates with the annular passageway 198 and is in registry with a passageway 204 formed in the head casting 118. The head casting is provided with a projection 206 upon the lower surface of which is formed a closed end T slot 208 shaped to engage the head 44 of the fitting 42.

A spring-pressed sealing member 210 is reciprocable in a cylindrical bore 212 formed in the projection 206, the sealing means being normally pressed against the end surface of the fitting 42 by a compression coil spring 214 which abuts against a plug 216 threaded in the upper end of the bore 212. The sealing means may be of any suitable construction such as is commonly used in connectors of this general type, as shown, for example, in the patent to Otto J. Herb, No. 1,679,863, granted August 7, 1928, or Patent No. 1,541,329, granted to me on June 9, 1925.

A pair of studs 218, 220 (Figure 3) are threaded in the head 24, these studs being preferably of substantially the same external shape as the fitting 42 and being slidable into suitable T-shaped slots formed in the body 116. The studs 218 and 220 and the fitting 42 are thus adapted to be slid into their respective T-shaped slots, thereby to form a detachable three-point connection between the body 116 and the barrel 10 and parts carried thereby. This connection is made by sliding the air motor body 116 to the left (Figure 2) relative to the barrel 10, at the same time positioning the pin 72 that it will enter the eye formed in the head 68 of the plunger 64.

When the air motor body is properly positioned relative to the barrel 10, a latch 222 will slide over the head of the stud 218 to lock the air motor to the barrel. The latch 222 is guided for vertical movement in a boss 224 formed at the side of the body casting 116, being pressed downwardly by a spring 226. The latch has a suitably knurled finger piece 228 threaded therein by which the latch may be raised out of locking position relative to the stud 218 so that the barrel 10 may be detached from the air motor.

Suitable means are provided for automatically operating the by-pass valve 104. This means comprises a plunger 230 rigidly secured to a piston 232 which is reciprocable in a cylinder 234. The plunger is normally held in its uppermost position by a compression coil spring 236. Whenever the air control valve 170 is opened, air under pressure will be supplied to the cylinder 234 through a conduit 238, one end of which is suitably secured at the end of passageway 194 and the other end of which is connected to a plug 240 threaded in the end of cylinder 234.

It will be understood that while but a single barrel 10, together with its plunger, cylinder and associated parts, is herein illustrated, it is intended that a plurality of the barrel and compressor units will be supplied with a single air motor, each barrel containing a different kind of lubricant for the lubrication of different types of bearings. For example, in an automobile service station the operator may have a rack upon which are mounted four or five barrels 10, with their associated parts, one barrel containing chassis lubricant, another barrel containing water pump lubricant, another universal joint lubricant, etc. Then in the lubrication of the automobile, the operator may successively connect the several barrels to the air motor to lubricate the different bearings requiring different types of lubricant. In this way a single air motor will serve as the power unit for any desired number of lubricant compressors, with resultant low initial cost and highly efficient operation.

The barrels 10 of the various compressors are adapted to be filled through the fitting 52 by means of a suitable transfer pump such as that shown, for example, in my copending application, Serial No. 672,106, filed May 22, 1933. During the filling operation, the vent valve 30 is opened to permit escape of air from behind the follower piston 12, the air flowing through the vent port 28, the passageway 40 and through the opening of the bushing 36 to the atmosphere. After the barrel has been completely filled, the vent valve 30 is closed and the barrel may be connected to the air motor as previously described, the latch 222 holding the barrel locked to the air motor. Upon connection of the air motor to a suitable source of air under pressure, the compressor will be in condition for use.

The operator will connect the coupler 88 of the discharge hose to a fitting attached to a bearing to be lubricated, and depress the trigger 186 to open the air control valve 170. As soon as this valve is opened, air under pressure will be supplied through the duct 202, passageway 204, sealing means 210, and fitting 42, to the right-hand end (Figure 2) of the barrel 10 to exert a priming pressure upon the follower 12. Lubricant will thus be forced under relatively low pressure into the high pressure cylinder 62 for ejection by the plunger 64 to the bearing. At the same time, as soon as the valve 170 is opened, air under pressure will be supplied to the cylinder 234 through the conduit 238, whereupon the piston 232 will force the plunger 230 into engagement with the head 112 of the valve stem 106 and depress the latter until the valve 104 is forced against its seat 105, thus closing the by-pass from the lubricant discharge conduit to the barrel. Likewise, upon opening the control valve 130, air under pressure will be supplied to the cylinder 128 of the air motor, causing the piston 130 to reciprocate rapidly.

The operation of the air motor itself is well known, being described in Patent No. 1,830,643, granted to me on November 3, 1931.

It will be noted that there is considerable lost motion between the connecting rod 138 and the piston 130, this lost motion making it possible for the piston to start from any position of rest in which it may have been stopped. If desired this lost motion may be provided in the connection between the connecting rod 138 and the bell crank 148 or between the latter and the plunger 64 instead of between the air motor piston and the connecting rod, or the lost motion may be otherwise distributed among these connections. It is likewise important that the exhaust from the cylinder 128 comes through the ports 135 before the end of the plunger 64 enters the cylinder 62. The piston 130 will continue reciprocating until the valve 170 is again closed, supplying lubricant under high pressure through the discharge conduit to the bearing to be lubricated.

After sufficient lubricant has been supplied to the bearing, the trigger 186 is released, permitting the valve 170 to close, whereupon the pressure in the cylinder 130 will rapidly drop to atmospheric pressure, permitting the by-pass control piston 232 to be forced upwardly by its spring 236, thereby opening the by-pass valve 104 and relieving the lubricant pressure in the discharge conduit 86. The relief of the pressure in the discharge conduit facilitates disconnection of the coupler 88 from the fitting.

After all of the bearings requiring one type of lubricant have been serviced, the barrel may be detached from the air motor by releasing the latch 222 and sliding the air motor to the right (Figure 1) relative to the barrel, and a barrel containing the next lubricant to be supplied to the bearings substituted therefor.

It will be noted that when the control valve 170 is closed the compressed air within the right-hand end of the barrel 10 is not released but is retained by the check valve 46 in the fitting 42. Thus, after the barrel has been used after refilling, there will always be some air pressure behind the piston to force the latter to the left and thereby prime the high pressure cylinder. The valve 34 forms a safety valve to prevent excessive pressures within the barrel 10.

While I have illustrated and described a specific embodiment of my invention, many modifications may be made without departing from the spirit of the invention, and I do not wish to be limited to the precise details set forth but desire to avail myself of all changes within the scope of the appended claims.

I claim:

1. A high pressure lubricant compressor comprising a high speed reciprocating air motor, said air motor comprising a piston and cylinder, a connecting rod secured to said piston by a lost motion connection, a pivotally mounted bell crank having one arm thereof pivotally connected to the end of said connecting rod and having a detachable connecting element upon the other arm thereof; and a lubricant reservoir having a high pressure pumping mechanism connected thereto, said pumping mechanism including a plunger, said plunger having an opening therein engageable with said detachable connecting element on said bell crank for operation thereby.

2. In a high pressure lubricant compressor, the combination of a reciprocating air motor, a lubricant reservoir, detachable means for securing said reservoir to said motor, a follower in said reservoir, means to supply air under pressure from said motor to said reservoir at one side of said follower, said last-named means comprising a passageway completed through one of said detachable connecting means, a high pressure pumping mechanism carried by said reservoir, means to connect said air motor to said pumping means as an incident to the connection of said reservoir to said air motor, whereby said pumping means may be operated by said air motor, a lubricant discharge conduit connected to said pumping means, a check valve interposed between said pumping means and said discharge conduit to prevent return flow from the latter to the former, a by-pass around said check valve, a valve controlling the flow of lubricant around said by-pass, and means associated with said air motor for closing said valve during the intervals that air under pressure is being supplied to said air motor.

3. A high pressure lubricant compressor comprising an air motor, a lubricant reservoir and pumping mechanism detachably connected to said air motor and having valve controlled means to by-pass lubricant from the discharge conduit of said mechanism to said reservoir, pneumatically operated means associated with said air motor for operating said valve, and means to supply air under pressure to said pneumatically operated means whenever air under pressure is being supplied to said air motor.

4. In a high pressure lubricant compressor, the combination of a pneumatically-operated motor unit, a lubricant pumping mechanism unit detachably secured to said motor, said mechanism having a discharge conduit, means connected to said pumping mechanism unit for relieving the lubricant pressure in the discharge conduit, and means connected to said motor unit for operating said pressure relieving means whenever said motor unit is being operated.

5. A high pressure lubricant compressor comprising a pneumatically-operated motor having a reciprocating part, a handle rigidly secured to said motor and positioned above the latter, a lubricant reservoir and pumping mechanism, said pumping mechanism having a reciprocating part, means for detachably securing said reservoir and pumping mechanism to said motor, said means including an easily detachable universal operating connection between the reciprocating parts of said motor and of said pumping mechanism, and means for conducting air under pressure to said reservoir to force the lubricant therein into said pumping mechanism.

6. In high pressure lubricating apparatus, the combination of a compressed air operated motor, a lubricant reservoir having high pressure pumping means connected thereto, said reservoir being detachably connectible to said motor, a lubricant discharge conduit connected to said pumping mechanism, valve means for relieving lubricant pressure in said discharge conduit, and mechanism securely and permanently connected to said air motor for operating said last-named means whenever air under pressure is being supplied to said motor.

7. In high pressure lubricating apparatus, the combination of an air pressure operated reciprocating motor, a high pressure pumping mechanism having a discharge conduit, means operable independently of said pumping mechanism for relieving the lubricant pressure in said discharge conduit, a pneumatic pressure operated plunger for controlling the operation of said last-named means, and a common manually operable valve for admitting air under pressure to said motor and to said plunger.

8. In a high pressure lubricant compressor, the combination of an air motor, a lubricant reservoir and high pressure pumping mechanism detachably secured to said motor, said mechanism including a reciprocable plunger having an opening at the outer end thereof, a bell crank pivotally mounted on said air motor, a connection between said motor and said bell crank for oscillating the latter, and a projection on said bell crank engageable in the opening of said plunger to form a universal driving connection between the bell crank and said plunger.

9. A power operated high pressure lubricant compressor comprising a reciprocating motor including a housing therefor, a lubricant container detachably secured to said housing, a high pressure pumping mechanism carried by said container, means associated with said high pressure pumping mechanism to relieve the pressure of lubricant discharged therefrom, and means carried by said motor housing for operating said pressure relieving means.

10. In a high pressure pneumatically operated lubricant compressor, the combination of a reciprocating air motor, a casing therefor, a handle forming a part of said casing, a manually operable valve for admitting power fluid to said air motor, a lubricant container having means for detachably connecting it to said motor casing, a high pressure cylinder secured to said container, a plunger reciprocable therein, a discharge conduit connected to the discharge end of said high pressure cylinder, a valve for relieving the lubricant pressure in the discharge conduit, and a power fluid operated plunger carried by said motor casing, said plunger being operable upon opening said power fluid valve to close said lubricant pressure relieving valve.

11. A high pressure lubricant compressor comprising a pneumatically operated reciprocating motor, said motor comprising a piston, a connecting rod having a lost motion connection with said piston so as to be reciprocable thereby, a bell crank having one arm thereof pivotally connected to one end of said connecting rod, a lubricant container, means for detachably securing said container to said motor casing, a high pressure pumping mechanism carried by said container, said pumping mechanism having a reciprocating plunger, and means for operatively connecting the other arm of said bell crank to said plunger as an incident to securing said container to said casing.

12. In a high pressure lubricant compressor, the combination of a pneumatically operated air motor, said motor comprising a high speed reciprocating piston, a cylinder therefor, valve means for admitting air under pressure to said cylinder, a casing including said cylinder, a lubricant reservoir having a barrel provided with a follower piston, a high pressure pump cylinder permanently secured to said barrel, a plunger reciprocable in said cylinder, a detachable operating connection between said plunger and the piston of said air motor, detachable means for connecting said barrel to said casing, said last named means comprising a coupling connection for transmitting air under pressure from the casing of said motor to said barrel at one side of said follower piston, thereby pneumatically to advance said follower piston to prime the high pressure lubricant pump.

13. A high pressure lubricant compressor comprising a compressed air motor, a container having a high pressure pump permanently connected thereto, said container including a lubricant reservoir having a follower piston, and detachable means for securing said container to said compressed air motor, said means including a detachable operative connection between the air motor and the plunger of said high pressure pumping mechanism, and a compressed air transmitting connection between the cylinder of said air motor and said reservoir to supply air under pressure behind said follower piston and force lubricant in said reservoir to said high pressure pumping mechanism.

14. In a high pressure lubricant compressor, the combination of a motor having a reciprocating part, a pump detachably connected to said motor and having a plunger reciprocable at an angle to the direction of reciprocation of said part, a lubricant reservoir secured to said pump for supplying lubricant thereto, and a detachable mechanical driving connection between said part and said plunger.

15. In a high pressure lubricant compressor, the combination of a motor having a reciprocating part, a pump detachably connected to said motor and having a plunger reciprocable in a direction perpendicular to the direction of reciprocation of said part, a lubricant reservoir secured to said pump for supplying lubricant thereto, and a detachable mechanical driving connection between said part and said plunger.

16. In a high pressure lubricant compressor, the combination of a motor having a reciprocating part, a pump and reservoir unit detachably secured to said motor, said pump having a reciprocating plunger, and a pivoted bell crank forming a driving connection between said part and said plunger, and means forming a detachable connection between said bell crank and said plunger.

17. In a high pressure lubricant compressor, the combination of a motor having a reciprocating part, a pump detachably secured to said motor and having a reciprocating plunger, and a pivoted bell crank forming a driving connection between said part and said plunger, said bell crank being permanently connected to one of said elements and detachably connected to the other.

18. In a high pressure lubricant compressor, the combination of an air motor, a lubricant reservoir having a follower piston therein, a high pressure pumping mechanism secured to said reservoir, and means for detachably securing said reservoir and pumping mechanism to said motor for operation of said pumping mechanism thereby, said means including an air supply connection to said reservoir.

19. In a high pressure lubricant compressor, the combination of an air motor, a reservoir having a pumping mechanism secured thereto, a follower piston in said reservoir, means for detachably securing said reservoir and pumping mechanism to said motor, and a quickly and easily separable to and fro driving connection between said motor and said mechanism, said connection being effected and said reservoir and mechanism being secured to said motor by movement of the latter relative to the former.

20. In a high pressure lubricant compressor, the combination of an air motor unit including a valve for controlling the supply of air under pressure to the motor of the unit, a lubricant container, a pumping mechanism carried by said container, means for detachably connecting said air motor unit to said pumping mechanism, and means for detachably connecting said air motor unit to said lubricant container, said last named means including a passageway for conducting air under pressure to said container whenever said control valve is opened, and check valve means to prevent return flow of air from said container.

21. In a high pressure lubricant compressor, the combination of a compressed air operated motor unit having a reciprocating part, a cylindrical lubricant reservoir, a follower piston freely reciprocable in said reservoir, a lubricant pumping mechanism permanently connected to said reservoir and having a reciprocating part, means for detachably connecting said motor unit to said pumping mechanism with said parts in operative engagement, means to connect said motor unit to said reservoir, said last named means having a passageway for conducting air under pressure to said reservoir, a source of air under pressure connected to said motor unit, and a valve forming a part of said motor unit for controlling the flow of air from said source both to the air motor of said unit and to said passageway leading to said reservoir, whereby air under pressure will be supplied to said reservoir whenever said air motor is operated.

ERNEST W. DAVIS.